H. WATERMAN.
Machine for Making Brick.
No. 456.  Patented Nov. 4, 1837.
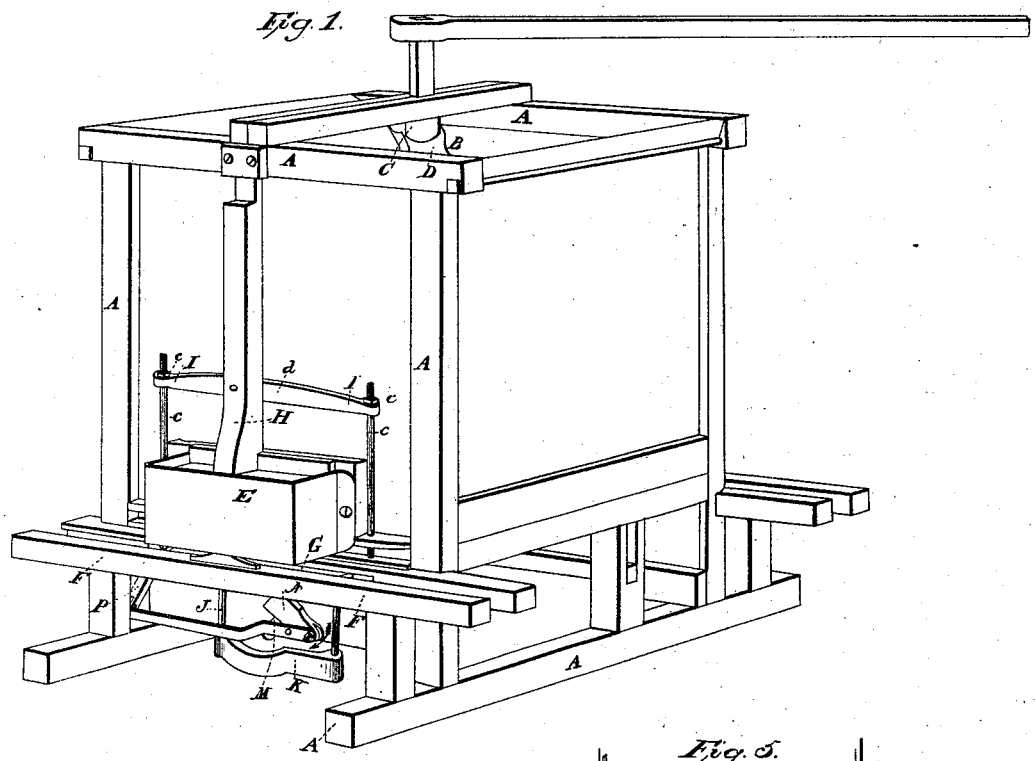
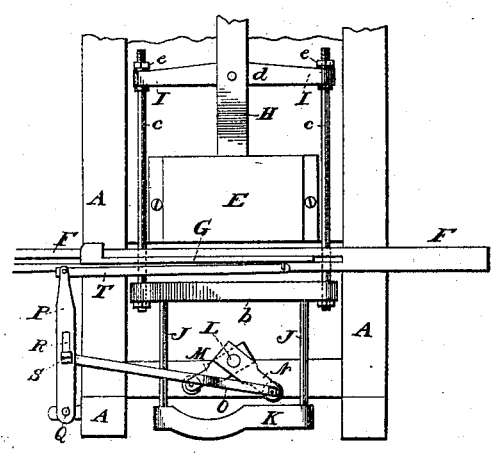
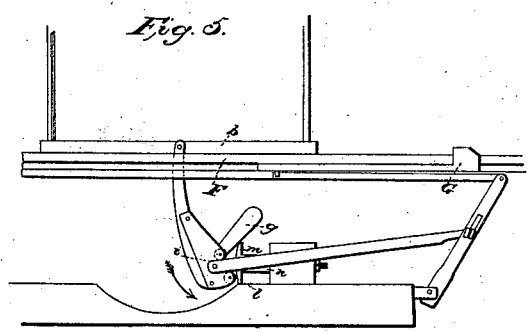
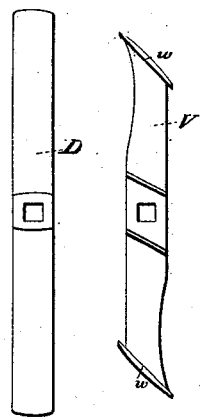
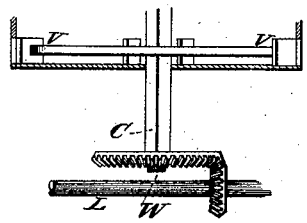
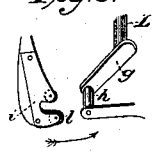

UNITED STATES PATENT OFFICE.

HENRY WATERMAN, OF BATH, MAINE.

IMPROVEMENT IN MACHINES FOR MOLDING AND PRESSING BRICKS.

Specification forming part of Letters Patent No. 456, dated November 4, 1837.

*To all whom it may concern:*

Be it known that I, HENRY WATERMAN, of Bath, in the county of Lincoln and State of Maine, have invented a new and useful Improvement in Machines for Making Bricks, which is described as follows, reference being had to the annexed drawings of the same, making part of this specification.

A represents the frame of the machine. (See Figure 1.)

B is the mixing-tub, in which the clay for the bricks is mixed.

C is the main shaft, to which the power is applied for operating the machine, which may be by a sweep, to which horses may be attached, said shaft extending below the mixing-tub, on which there is a horizontal bevel-wheel $w$. (See Figs. 1 and 3.)

D represents knives, Fig. 1, through which the main shaft passes for mixing the clay; or, in other words, slipped over the main shaft.

E, Fig. 1, is a rectangular metallic chamber at the side of the mixing-tub, designed to receive the clay from the latter, having bars at the bottom crossed at right angles, which form divisions corresponding with the molds placed below, into which the clay is forced, the clay being conveyed to said chambers through apertures at the bottom of the mixing-tub by means of certain conveyers fixed on the main shaft at the bottom of the mixing-tub, hereinafter described. A chamber similar to that marked E is placed on the opposite side of the frame.

F are ways with channels formed on the sides thereof, in which the carriage slides for conveying the molds to the chamber. (See Figs. 1 and 5.)

G, Fig. 1 and 2, is the carriage for conveying the molds under the chamber, moved by an arm, hereinafter described.

H is a piston working in the chamber for pressing the clay into the molds, Fig. 1.

I, Figs. 1 and 2, is a frame attached to the piston for elevating and depressing it. This frame is composed of a horizontal bar of iron $b$, from each end of which rises an iron rod $c\,c$, with a male screw cut on the end thereof. Parallel with this bar is another bar $d$, with a round aperture in each end, which is slipped over the ends of the rods and rests upon shoulders formed thereon, said bar being fastened permanently to the piston-rod H. On the upper ends of these vertical rods are screwed nuts $e\,e$, which may be raised or lowered, as required, to allow of more or less play of the bar attached to the piston, in order to regulate the pressure of the latter in forcing the clay into the molds.

J J, Figs. 1 and 2, are two iron rods projecting downward from the lower bar of the frame first described, united at their lower ends by a cross-bar K, one half of the upper side of which is straight and the other half curved. It is placed farther out or its thickness in advance of the face of the bar $b$, so that one of the cams, hereinafter described, shall strike it for depressing the piston, while the other cam strikes the bar marked $b$, for again raising the piston.

L is a horizontal shaft turning in the center of the frame below the mixing-tub, on which there is a vertical bevel-pinion, into which works the horizontal bevel-wheel placed on the main shaft. (See Fig. 3.)

M N are two cams, before mentioned, fixed on the end of the horizontal shaft L, for raising and lowering the piston alternately, each cam having an anti-friction roller in the end thereof. As the shaft revolves cam M comes in contact with the cross-bar $b$ and raises the piston. As the shaft L continues to revolve cam N comes in contact with bar K and again depresses the piston, one cam being set outside the other for that purpose. To the outside cam is attached an arm O to a pin or wrist. Said arm leads to an arm P, moving on a pin Q at the side of the frame. A slot R is made in the arm P, in which moves a screw-bolt S, that passes through the end of the arm, for regulating the movement of the carriage—that is, giving it a greater or less sweep.

T is an arm leading from the upper extremity of the arm P to the carriage G, to which it is attached, for giving it a movement backward and forward. (See Figs. 1 and 2.)

The piston may be elevated or depressed by a different mechanical arrangement from that just described—namely, instead of having two cams on the end of the horizontal shaft a single crank $g$ (see Figs. 5 and 6) may be substituted, with a wrist $h$, that shall as the crank revolves take into a hook $i$, suspended from the lower cross-bar $b$ of the frame of the piston, and draw it down as the crank turns below its axis, and as it rises is made to push the piston up again, said hook having an anti-friction roller $l$ in its front, which comes in contact with a projection or regulator $m$, for disengaging it from the wrist $h$, said regulator having a shank $n$, passing through a post of the frame, with a screw cut on it to receive a nut $o$. A similar arrangement of either of the before-described methods of elevating and depressing the piston and moving the carriage backward and forward is placed at the opposite side of the frame, the horizontal shaft being extended across the frame from one side to the other for that purpose.

The conveyers V, for conveying the clay from the mixing-tub into the chambers, are made with wings $w$, and are fixed on the main shaft at the bottom of the mixing-tub. (See Fig. 4, and also Fig. 3.)

The mixing-tub, the knives and sweep on the main shaft, the discharging-apertures at the bottom of the mixing-tub, the rectangular chambers, and grating at the sides of the tub are similar to those in other machines in use, and therefore need not be particularly described.

The machine being put in motion and the clay properly mixed and a set of molds carried under the grating of the chamber, the clay is forced or carried into the chamber by the conveyers V on the main shaft. The horizontal bevel-wheel turns the vertical bevel-pinion. This turns the horizontal shaft with the cams on its end in the direction of the arrow. Cam N comes in contact with bar K of the piston-frame and causes the piston to descend, which forces the clay into the molds. At the same time the arms O, attached to the same cam N, pushes arm P from the frame, which carries back the carriage by means of the arm T, attached to it. The horizontal shaft, continuing to revolve, brings cam M against bar $b$ and causes the piston to rise. The carriage, with a new set of molds, is carried under the chamber. At the same time the filled molds are pushed forward and removed, and in this manner the operation is continued. The operation with the second arrangement is similar, except that instead of the cams for elevating and depressing the piston the crank and hooks are used, in the manner before described, and represented in Figs. 5 and 6.

The invention claimed by me, the said HENRY WATERMAN, and which I desire to secure by Letters Patent, consists—

1. In the method of moving the piston by means of the cams and frames, as before described.

2. The method of moving the carriage by the arrangement of the arms attached to and moved by one of the cams, as before described.

3. The construction of the conveyers V, for conveying the clay from the mixing-tub through the apertures at the bottom thereof into the chambers E, in combination with the other parts of the machine, as above described.

4. The second method of moving the piston by the crank and hook, as before described.

5. The method of regulating the pressure of the piston by the nuts on the ends of the vertical rods, as above described.

HENRY WATERMAN.

Witnesses:
 WM. P. ELLIOT,
 SEWALL SHOOT.